United States Patent Office 2,977,650
Patented Apr. 4, 1961

2,977,650

SHELL MOLD ADHESIVE COMPOSITION

Frank P. Ilenda, Painesville, and Joseph C. Noyes, Jr., Shaker Heights, Ohio, assignors to Diamond Alkali Company, Cleveland, Ohio, a corporation of Delaware No Drawing. Filed Nov. 27, 1957, Ser. No. 699,193

17 Claims. (Cl. 22—194)

This invention relates to improvements in the metal casting art and more particularly relates to a new and improved adhesive composition especially useful in the assembly of molds and cores for the preparation of metal casting-defining structures.

This is a continuation-in-part of Serial No. 652,350 filed April 12, 1957, and now issued as U.S. Patent 2,896,280.

In recent years there has been considerable interest in metal casting molds and cores formed from sand-alkali metal silicate mixtures cured, i.e., hardened, into a casting-defining structure by exposure to carbon dioxide or other gaseous curing agent. Generally, the curing of such molds involves a chemical reaction between the gaseous curing agent, e.g., carbon dioxide, and the alkali metal silicate dispersed throughout the sand or other refractory material thereby to form a uniformly-dispersed silicon dioxide gel binder.

Despite the many advantages of such a technique, e.g., avoidance of mold or core aging and post-curing treatments heretofore considered essential, thus permitting rapid fabrication of molds and cores without requiring the use of expensive equipment while also permitting close tolerance castings, in addition to being a relatively simple process adapted to large scale operation, certain difficulties have been encountered in the process which heretofore have precluded its even wider spread application.

One of the difficulties has been the lack of a generally satisfactory means for assembling core and/or mold elements into the desired final casting-defining structure. It will be appreciated that where castings of intricate shape are to be produced, it often is essential that the mold or core elements be prepared separately and then assembled to form the desired final shape.

In this connection, the term "mold" as used throughout including shell molds comprising thin-walled shell mold-forming elements in addition to a completed shell mold structure prepared by assembling two or more complementary thin-walled shell mold elements to provide a casting-defining surface therebetween. Thus, it will be appreciated that the term "mold" is used in a generic sense to mean casting forms broadly as including both molds and cores.

Accordingly, the principal object of the invention is to provide a new and improved rapid-setting adhesive composition which facilitates assembly of molds and cores, particularly those formed using a silicate binder cured by carbon dioxide, or the like.

A further object of the invention is to provide a new and improved process for preparing such an adhesive.

A still further object of the invention is the provision of a new and improved adhesive composition.

These and other objects and advantages of the invention will appear more fully from the following description thereof.

The present invention comprises a quick-setting, high strength, adhesive bond-forming composition comprising a mixture of a major proportion, i.e., greater than 50% by weight, of a liquid alkali metal silicate having a silicon dioxide: alkali metal oxide weight ratio greater than 1:1, and minor proportions, i.e., less than 50% by weight, of an aliphatic polyhydroxy compound, e.g., sorbitol, mannitol, glycerine, sugar or the like, sugar being preferred because of low cost and availability, bentonite and zinc oxide. In certain instances, manganese dioxide, preferably of a low bulk density, also may be incorporated.

While the proportions of an adhesive composition in accordance with the present invention are indicated generally hereinbefore, these proportions preferably fall within the following ranges:

|  | Percent by weight |
|---|---|
| Aliphatic polyhydroxy compound | 1 to 15 |
| Zinc oxide | 1 to 6 |
| Manganese dioxide (finely-divided) | 0 to 6 |
| Bentonite | 6 to 18 |
| Liquid alkali metal silicate | 60 to 92 |

More specifically, a preferred type of composition in accordance with this invention is the following:

|  | Percent by weight |
|---|---|
| Sugar (sucrose) | 1 to 15 |
| Manganese dioxide (300 mesh) | 0 to 2 |
| Zinc oxide | 1 to 3 |
| Bentonite (Western) | 6 to 18 |
| Liquid sodium silicate ($SiO_2:Na_2O$ ratio greater than 1:1) | 60 to 92 |

A specific illustrative preferred composition of this invention has the following composition:

|  | Percent by weight |
|---|---|
| Sugar (sucrose-cane sugar) | 13.0 |
| Zinc oxide (paint pigment grade) [1] | 2.5 |
| Manganese dioxide wad type-ground to 300 mesh | 0.5 |
| Bentonite (Western-Yellowstone) | 14.0 |
| Sodium silicate ($SiO_2:Na_2O=3.22:1.0$) | 70.0 |

[1] New Jersey Zinc Co. XX Series.

Other illustrative compositions of this invention are the following wherein the numbers indicate parts by weight.

| | | | | |
|---|---|---|---|---|
| Sugar | 13.0 | 13.0 | 13.0 | 13.8 |
| Zinc Oxide | 3.0 | 2.5 | 2.0 | 1.7 |
| Manganese Dioxide | 0.0 | 0.5 | 1.0 | 1.7 |
| Bentonite | 14.0 | 14.0 | 14.0 | 13.8 |
| Sodium Silicate | 70.0 | 70.0 | 70.0 | 69.0 |

The zinc oxide (ZnO) employed in the practice of this invention generally may be any commercially available product derived from ore or zinc metal, although superior results are obtained with substantially pure ZnO. Moreover, superior results are obtained using zinc oxide of a relatively fine particle size, generally referred to as a "pigment grade" or "paint grade" zinc oxide, e.g., having a particle size less than about 1 micron, typically about 0.10 to 0.50 micron. It will be understood, of course, that a larger particle size zinc oxide may be used, and in certain instances from a cost standpoint may be advantageous. However, a smaller particle size facilitates uniform dispersion and is generally preferred. Illustrative of suitable commercially available products are brands "XX-55" and "Kadox-15" of The New Jersey Zinc Sales Company. A typical analysis of the latter product is as follows:

|  | Percent by weight |
|---|---|
| ZnO | 99.7 |
| S (as $SO_3$) | 0.02 |
| PbO | 0.001 |
| Water sol. salts | 0.06 |
| Acidity as $SO_3$ | 0.01 |

When manganese dioxide is employed in combination with zinc oxide, the manganese dioxide preferably has a particle size of less than 300 mesh (—300 U.S. mesh). This particle size limitation in many applications is quite critical because if a larger particle size manganese dioxide is used it is observed that in the resultant mixture the manganese dioxide will not remain uniformly dispersed. Generally, while 300 mesh represents a critical definition of the maximum particle size of the low bulk density manganese dioxide, there generally is no minimum particle size, i.e., the finer the manganese dioxide particle size the better.

More specifically, when manganese dioxide is employed, it is desirable to use a manganese dioxide, having the aforementioned particle size, i.e., less than 300 mesh, which is a so-called "wad" type manganese dioxide which expression refers as a field or generic term to hydrous manganese dioxide. Typical analyses, in terms of parts by weight, of "wad" type manganese dioxide are the following:

| Ingredient | A | B |
|---|---|---|
| $K_2O$ | 0.61 | |
| $Na_2O$ | 0.31 | 1.22 |
| $CaO$ | 1.32 | 6.69 |
| $MgO$ | 0.54 | 0.66 |
| $BaO$ | 9.53 | 0.37 |
| $CuO$ | 0.05 | |
| $CoO$ | 0.10 | |
| $NiO$ | 0.10 | |
| $MnO$ | 3.59 | 4.62 |
| $MnO_2$ | 61.38 | 62.03 |
| $Al_2O_3$ | 2.91 | 0.27 |
| $Fe_2O_3$ | 5.86 | 3.59 |
| $SiO_2$ | 3.40 | |
| $H_2O$ | 9.85 | 11.21 |

The term "sugar" as employed in the specification and claims is intended to refer to sugar in a conventional sense as including various mono- and polysaccharides, especially mono- and disaccharides such as tetroses $(C_4H_8O_4)$, pentoses $(C_5H_{10}O_5)$, methyl pentoses $$(C_6H_{12}O_5)$$

hexoses $(C_6H_{12}O_6)$, polydisaccharides such as pentose-hexose $(C_{11}H_{20}O_{10})$, methyl pentose-hexose $(C_{11}H_{20}O_{10})$, as well as trisaccharides and tetrasaccharides such as 2-methyl-pentose-hexose and 3-hexose, in addition to 4-hexose. The preferred sugar is sucrose. 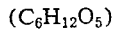

The term "bentonite" as used in the specification and claims is intended to refer to the mineral hydrated aluminum silicate, the main component being montmorillonite $(Al_2O_3 \cdot 4SiO_2 \cdot H_2O)$ or, more generally, as a clay or clay-like material which swells when wet and has strong absorbent properties. The preferred type of bentonite characterized by swelling when wet is a so-called "Western bentonite." More specifically, bentonite is a clay mineral composed of several members of the montmorillonite group, chiefly pyrophyllite, nontronite, talc and beidellite. Bentonite conforms to the expanding crystal lattice consisting of a gibbsite sheet enclosed between two silica sheets, thus differing from kaolinite which consists of a non-expanding crystal lattice wherein one gibbsite sheet is condensed with one silica sheet. A specifically preferred bentonite is the material known as "Yellowstone bentonite."

The liquid alkali metal silicate, i.e., an aqueous solution of an alkali metal silicate normally liquid at room temperature having a silicon dioxide:alkali metal oxide ratio greater than 1.0. While various alkali metal silicates can be used, including potassium silicates, sodium silicates, and silicates of the other alkali metals such as lithium, rubidium, cesium, it will be appreciated that sodium silicates are generally the most readily available and most economical. Accordingly, particular emphasis is made throughout the specification and claims to sodium silicates although it is to be understood that the invention is not to be so limited. It will be understood thus that the silicate is a so-called "silicious silicate," i.e., having a predominant amount of silicon dioxide as compared to a lesser proportion of alkali metal oxide. The preferred silicates are sodium silicates having a silicon dioxide:sodium oxide ratio greater than 1.0:1.0, preferably in the range from about 2.8 to 3.75:1 and a specific gravity within the range from about 40° to 43° Bé., measured at 20° C., typically preferred silicates having specific gravities of about 41.5° Bé. and about 42° Bé.

The present invention is also directed to the method of preparing the herein-described adhesive composition. Generally, the process of this invention comprises the steps of adding a minor amount of an aliphatic polyhydroxy compound, e.g., sugar, to a major proportion of a liquid alkali metal silicate until it is dissolved therein, thereafter adding the zinc oxide, and manganese dioxide, if used, to the thus-formed mixture until thoroughly and uniformly dispersed therein and subsequently adding bentonite until the desired dispersion is obtained.

While either the sugar or zinc oxide, and manganese dioxide, if used, can be added to the liquid silicate first, or, if desired, simultaneously or in admixture, it is essential that the bentonite be added last. If the bentonite is mixed directly with the silicate, and manganese dioxide and sugar added subsequently, it is found that the high adsorptive properties of the bentonite result in a drying of the silicate which results in an unsatisfactory, non-uniform mixture unsuitable for many applications.

In the following examples the reference to "test blocks" means 2-inch cubes prepared by impregnating a sand-sodium silicate mixture with carbon dioxide. The exposure to carbon dioxide cures the cube into a rigid high-strength block by converting the sodium silicate into a silicon dioxide gel uniformly dispersed throughout the sand. In order that those skilled in the art may more completely understand the present invention and the preferred methods by which the same may be carried into effect, the following specific examples are offered:

*Example I*

A core paste is produced by combining 196 lbs. (70%) liquid sodium silicate ($SiO_2:Na_2O=3.22:1.0$, 41.5°–42.5° Bé.), 36.4 lbs. (13%) sugar, 7.0 lbs. (2.5%) zinc oxide (New Jersey Zinc XX), 1.4 lbs. (0.5%) manganese dioxide, and 39.2 lbs. (14%) bentonite. This adhesive is applied between 2-inch sand-silicate ($CO_2$-cured) blocks. Tests are conducted 15, 30 and 120 minutes by pulling thus-joined blocks apart; in each instance the blocks separated at the sand line and the adhesive bond did not fracture.

*Example II*

A core paste is prepared by mixing 200 gms. liquid sodium silicate ($SiO_2:Na_2O=3.22:1.0$, 41.5°–42.5° Bé.), 40 gms. sugar, 5 gms. manganese dioxide (wad type), 5 gms. zinc oxide, and 40 gms. bentonite in this order. Substantially the same results of Example I are obtained when applied to core elements to be adhesively joined.

*Example III*

A core paste embodying the present invention is prepared by mixing 13 parts sugar (sucrose) with 70 parts of a liquid sodium silicate ($SiO_2:Na_2O=3.22:1.0$, 41.5°–42.5° Bé.), until the sugar is completely dissolved. There are then added 3 parts of zinc oxide and, subsequently, 14 parts bentonite (Yellowstone). The resultant paste exhibits excellent adhesive properties.

It is to be understood that, although the invention has been described with specific reference to particular embodiments thereof, it is not to be so limited since changes and alterations therein may be made which are within the full intended scope of this invention as defined by the appended claims.

What is claimed is:

1. A core paste composition of matter comprising the following ingredients in about the proportions stated:

| | Percent by weight |
|---|---|
| Aliphatic polyhydroxy compound selected from the group consisting of sugar, sorbitol, mannitol and glycerine | 1 to 15. |
| Zinc oxide | 1 to 6. |
| Manganese dioxide | 0 to 6. |
| Bentonite | 6 to 18. |
| Liquid alkali metal silicate | Balance (to 100%). |

2. A core paste composition of matter comprising the following ingredients in about the proportions stated:

| | Percent by weight |
|---|---|
| Sugar | 1 to 15. |
| Zinc oxide | 1 to 3. |
| Manganese dioxide | 0 to 2. |
| Bentonite | 6 to 18. |
| Liquid alkali metal silicate | Balance. |

3. A core paste composition according to claim 1 wherein the silicate is a sodium silicate.

4. A core paste composition according to claim 1 wherein the silicate is a sodium silicate having a silicon dioxide : sodium oxide ratio greater than 1.0 : 1.0.

5. A core paste composition according to claim 1 wherein the particle size of the manganese dioxide is less than 300 mesh.

6. A core paste composition of matter comprising in admixture the following in about the proportions stated:

| | Percent by weight |
|---|---|
| Sugar | 1 to 15. |
| Zinc oxide | 1 to 6. |
| Manganese dioxide (−300 mesh) | 0 to 6. |
| Western bentonite | 6 to 18. |
| Liquid sodium silicate ($SiO_2:Na_2O$=2.8 to 3.75:1.0) | Balance. |

7. A core paste composition of matter comprising in admixture the following:

| | Percent by weight |
|---|---|
| Liquid sodium silicate ($Na_2O:SiO_2$=1:3.22) | 70.0 |
| Cane sugar | 13.0 |
| Zinc oxide | 2.5 |
| Manganese dioxide (−300 mesh) | 0.5 |
| Western bentonite | 14.0 |

8. A core paste composition of matter comprising in admixture the following:

| | Percent by weight |
|---|---|
| Liquid alkali metal silicate | 70 |
| Zinc oxide | 3 |
| Cane sugar | 13 |
| Bentonite | 14 |

9. A core paste composition according to claim 6 wherein the manganese dioxide is a wad type ore.

10. A core paste composition according to claim 6 wherein the bentonite is a Yellowstone Bentonite.

11. A core paste composition according to claim 1 wherein the manganese dioxide is a wad type ore and the bentonite is a Yellowstone Bentonite.

12. The method of preparing a quick-setting, adhesive composition which comprises the steps of dissolving about 1% to 15% by weight of an aliphatic polyhydroxy compound selected from the group consisting of sugar, sorbitol, mannitol and glycerine in a major amount of a liquid alkali metal silicate constituting the balance of the composition, adding to the thus-prepared mixture 1% to 6% by weight of finely-divided zinc oxide until thoroughly dispersed therein and thereafter dispersing 6% to 18% by weight bentonite therein.

13. The method according to claim 12 wherein up to 6% by weight of manganese dioxide also is incorporated prior to addition of the bentonite.

14. The method according to claim 13 wherein the aliphatic polyhydroxy compound selected from the group consisting of sugar, sorbitol, mannitol and glycerine constitutes about 1 to 15% by weight of the silicate, the manganese dioxide has a particle size smaller than 300 mesh and constitutes about 1 to 6% by weight of the silicate, and the bentonite constitutes about 6 to 18% by weight of the silicate present.

15. The method of preparing a quick-setting adhesive which comprises the steps of dissolving about 8 parts of cane sugar in about 70 parts of a liquid sodium silicate having an $SiO_2:Na_2O$ ratio of 3.22:1.0, thereafter dispersing 1 to 6 parts of zinc oxide therein and subsequently dispersing in the thus-formed mixture about 18% Western Bentonite.

16. In the production of castings via the use of thin-walled rigid shell molds characterized by a fine, accurately-dimensioned, casting-defining surface, the improvement which comprises adhesively joining complementary sections of said shell mold by applying as an adhesive a composition as defined in claim 1 to at least one of said sections and thereafter placing said sections in contact with each other thereby to form a quick-setting, adherent bond and resultant unitary shell mold structure.

17. In the preparation of molds or cores for metal casting operations using as a core or mold binder an alkali metal silicate-finely-divided refractory material contacted with a gaseous hardening substance while in the desired casting-defining shape, the improvement which comprises assembling molds or core elements so prepared into a metal casting-defining structure which comprises applying a composition as defined in claim 1 as an adhesive to at least one of said sections and thereafter placing said sections in contact with each other through said adhesive whereby a quick-setting, high strength adhesive bond is effected and a unitary casting-defining structure formed thereby.

References Cited in the file of this patent

UNITED STATES PATENTS

| | | |
|---|---|---|
| 1,247,595 | Tompkins | Nov. 20, 1917 |
| 1,498,270 | Harris | June 17, 1924 |
| 2,111,131 | Weyganot | Mar. 15, 1938 |
| 2,311,271 | Ware | Feb. 16, 1943 |
| 2,536,871 | Carlton | Jan. 2, 1951 |
| 2,661,298 | Shanley | Dec. 1, 1953 |
| 2,736,678 | Olix | Feb. 28, 1956 |
| 2,772,177 | Lander | Nov. 27, 1956 |
| 2,788,285 | Lander | Apr. 9, 1957 |
| 2,896,280 | Ilenda et al. | July 28, 1959 |

FOREIGN PATENTS

| | | |
|---|---|---|
| 745,402 | Great Britain | Feb. 22, 1956 |